US008879742B2

(12) United States Patent
Disch et al.

(10) Patent No.: US 8,879,742 B2
(45) **Date of Patent: *Nov. 4, 2014**

(54) APPARATUS FOR DETERMINING A SPATIAL OUTPUT MULTI-CHANNEL AUDIO SIGNAL

(75) Inventors: Sascha Disch, Fuerth (DE); Ville Pulkki, Espoo (FI); Mikko-Ville Laitinen, Espoo (FI); Cumhur Erkut, Helsinki (FI)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 360 days.

This patent is subject to a terminal disclaimer.

(21) Appl. No.: 13/291,964

(22) Filed: Nov. 8, 2011

(65) Prior Publication Data

US 2012/0051547 A1 Mar. 1, 2012

Related U.S. Application Data

(60) Division of application No. 13/025,999, filed on Feb. 11, 2011, which is a continuation of application No. PCT/EP2009/005828, filed on Aug. 11, 2009.

(60) Provisional application No. 61/088,505, filed on Aug. 13, 2008.

(30) Foreign Application Priority Data

Oct. 28, 2008 (EP) .................................... 08018793

(51) Int. Cl.

| | |
|---|---|
| ***H04R 5/00*** | (2006.01) |
| ***G06F 17/00*** | (2006.01) |
| ***H04S 7/00*** | (2006.01) |

(52) U.S. Cl.

CPC ............... *H04S 7/30* (2013.01); *H04S 2400/11* (2013.01); *H04S 2420/03* (2013.01)

USPC ................................. 381/17; 381/22; 700/94

(58) Field of Classification Search

CPC ... H04S 2420/11; H04S 2420/03; H04S 7/30; H04S 2400/11

USPC .................................. 381/17–23, 57; 700/94

See application file for complete search history.

(56) References Cited

U.S. PATENT DOCUMENTS

| | | | |
|---|---|---|---|
| 5,210,366 | A | 5/1993 | Sykes, Jr. |
| 5,671,287 | A | 9/1997 | Gerzon |

(Continued)

FOREIGN PATENT DOCUMENTS

| | | |
|---|---|---|
| CN | 101040512 | 9/2007 |
| CN | 101138021 | 5/2008 |

(Continued)

OTHER PUBLICATIONS

"Concepts of Object-Oriented Spatial Audio Coding", International organization for standardization (organisation internationale de normalization), ISO/IEC JTC 1/SC 29/WG 11, coding of moving pictures and audio, Jul. 2006, 8 pages.

(Continued)

*Primary Examiner* — Xu Mei
*Assistant Examiner* — David Ton
(74) *Attorney, Agent, or Firm* — Michael A. Glenn; Perkins Coie LLP

(57) ABSTRACT

An apparatus for determining a spatial output multi-channel audio signal based on an input audio signal and an input parameter. The apparatus includes a decomposer for decomposing the input audio signal based on the input parameter to obtain a first decomposed signal and a second decomposed signal different from each other. Furthermore, the apparatus includes a renderer for rendering the first decomposed signal to obtain a first rendered signal having a first semantic property and for rendering the second decomposed signal to obtain a second rendered signal having a second semantic property being different from the first semantic property. The apparatus comprises a processor for processing the first rendered signal and the second rendered signal to obtain the spatial output multi-channel audio signal.

5 Claims, 6 Drawing Sheets

(56) References Cited

U.S. PATENT DOCUMENTS

| | | | |
|---|---|---|---|
| 7,162,045 | B1 | 1/2007 | Fujii |
| 7,394,903 | B2 | 7/2008 | Herre et al. |
| 7,447,317 | B2 | 11/2008 | Herre et al. |
| 8,374,365 | B2 | 2/2013 | Goodwin et al. |
| 2007/0112559 | A1 | 5/2007 | Schuijers et al. |
| 2008/0085009 | A1 | 4/2008 | Merks et al. |
| 2008/0130904 | A1 | 6/2008 | Faller |
| 2008/0187144 | A1 | 8/2008 | Seo et al. |
| 2008/0205676 | A1 | 8/2008 | Merimaa et al. |
| 2010/0023335 | A1 | 1/2010 | Szczerba et al. |

FOREIGN PATENT DOCUMENTS

| | | | |
|---|---|---|---|
| GB | 2353193 | | 2/2001 |
| GB | 2353193 | A | 2/2001 |
| HR | 1020070086851 | | 8/2007 |
| JP | H10215498 | | 8/1998 |
| JP | 11231865 | | 8/1999 |
| JP | 2001069597 | | 3/2001 |
| JP | 2008507184 | | 3/2008 |
| JP | 2008170412 | | 7/2008 |
| JP | 2010507943 | | 3/2010 |
| KR | 10-2004-0037437 | | 5/2004 |
| RU | 2006114742 | | 11/2007 |
| RU | 2329548 | | 7/2008 |
| WO | 00/19415 | A2 | 4/2000 |
| WO | WO-2005086139 | | 9/2005 |
| WO | 2007/078254 | A2 | 7/2007 |
| WO | 2008049587 | | 5/2008 |

OTHER PUBLICATIONS

Lee, et al., "A personalized preset-based audio system for interactive service", AES Convention Paper No. 6904, New York, Ny, USA, pp. 1-6.

Merimaa, et al., "Spatial impulse response rendering I: Analysis and synthesis", Journal of the AES, New York, NY, USA, Dec. 1, 2005, pp. 1115-1127.

Pulkki, "Spatial Sound Reproduction with Directional Audio Coding", Journal of the AES, vol. 55, No. 6, New York, NY, USA, Jun. 1, 2007, pp. 503-516.

Shimada, et al., "A core experiment proposal for an additional SAOC functionality of separating real-environment signals into multiple objects", ISO/IEC JTC1/SC29WG11, MPEG 2008/M15110, Antalya, Turkey, Jan. 9, 2008, 17 pages.

Lee, Taejin et al., "An Object-based 3D Audio Broadcasting System for Interactive Service", AES 118th Convention, Barcelona, Spain, May 28-31, 2005, 8 pages.

Potard, "Decorrelation Techniques for the Rendering of Apparent Sound Source Width in 3D Audio Displays", Proc. of the 7th Int'l Conference on Digital Audio Effects (DAFx'04), Naples, Italy, Oct. 5-8, 2004, pp. 280-284.

Pulkki, et al., "Multichannel audio rendering using amplitude panning [DSP Applications]", IEEE Signal Processing Magazine, IEEE Service Center, Piscataway, NJ, US, vol. 25, No. 3, May 1, 2008, pp. 118-122.

1 Engdegard, Jonas et al., "Spatial Audio Object Coding (SAOC)—The Upcoming MPEG Standard on Parametric Object Based Audio Coding", Presented at the 124th Convention; May 17-20, 2008, Amsterdam, Netherlands.

Pulkki, V. et al., "Spatial Sound Reproduction With Directional Audio Coding", Journal of the AES. vol. 55, No. 6., Jun. 2007, pp. 503-516.

Breebaart, J et al., "High-Quality Parametric Spatial Audio Coding at Low Bitrates", AES 116th Convention. Berlin, Preprint 6072., May 2004, 1-13.

Herre, J et al., "MPEG Surround—The ISO/MPEG Standard for Efficient and Compatible Multi-Channel Audio Coding", Proceedings of the 122nd AES Convention. Vienna, Austria., May 2007, 1-23.

Lee, et al., "Object-Based 3D Audio Broadcasting Sytem for Interactive Service", XP-002577516; Convention Paper 6384, Barcelona Spain, May 28-31, 2005, 1-8.

Potard, "Decorrelation Techniquies for the Rendering of Apparent Sound Source Width in 3D Audio Displays", XP-002369776; University of Wollongong, Australia; Oct. 5-8, 2004, 280-284.

Pulkki, et al., "Multichannel Audio Rendering Using Amplitude Panning", IEEE Signal Processing Magazine; University of Helsinki, Finland; May 2008, 118-122.

Wagner, A et al., "Generation of Highly Immersive Atmospheres for Wave Field Synthesis Reproduction", 116th International EAS Convention. Berlin, Germany., May 2004, 1-9.

Duxbury, C et al., "Separation of Transient Information in Musical Audio Using Multiresolution Analysis Techniques", Proceedings of the COST G-6 Conference on Digital Audio Effects (DAFX-01). Limerick, Ireland., Dec. 6, 2001, pp. 1-4.

(STATE OF THE ART)

(STATE OF THE ART)

APPARATUS FOR DETERMINING A SPATIAL OUTPUT MULTI-CHANNEL AUDIO SIGNAL

CROSS-REFERENCE TO RELATED APPLICATIONS

This application is a divisional of U.S. patent application Ser. No. 13/025,999, filed Feb. 11, 2011, which is a continuation of International Patent Application No. PCT/EP2009/005828 filed Aug. 11, 2009, and claims priority to U.S. Application No. 61/088,505, filed Aug. 13, 2008, and additionally claims priority from European Application No. EP 08 018 793.3, filed Oct. 28, 2008, all of which are incorporated herein by reference in their entirety.

The present invention is in the field of audio processing, especially processing of spatial audio properties.

BACKGROUND OF THE INVENTION

Audio processing and/or coding has advanced in many ways. More and more demand is generated for spatial audio applications. In many applications audio signal processing is utilized to decorrelate or render signals. Such applications may, for example, carry out mono-to-stereo up-mix, mono/stereo to multi-channel up-mix, artificial reverberation, stereo widening or user interactive mixing/rendering.

For certain classes of signals as e.g. noise-like signals as for instance applause-like signals, conventional methods and systems suffer from either unsatisfactory perceptual quality or, if an object-orientated approach is used, high computational complexity due to the number of auditory events to be modeled or processed. Other examples of audio material, which is problematic, are generally ambience material like, for example, the noise that is emitted by a flock of birds, a sea shore, galloping horses, a division of marching soldiers, etc.

Conventional concepts use, for example, parametric stereo or MPEG-surround coding (MPEG=Moving Pictures Expert Group). FIG. 6 shows a typical application of a decorrelator in a mono-to-stereo up-mixer. FIG. 6 shows a mono input signal provided to a decorrelator 610, which provides a decorrelated input signal at its output. The original input signal is provided to an up-mix matrix 620 together with the decorrelated signal. Dependent on up-mix control parameters 630, a stereo output signal is rendered. The signal decorrelator 610 generates a decorrelated signal D fed to the matrixing stage 620 along with the dry mono signal M. Inside the mixing matrix 620, the stereo channels L (L=Left stereo channel) and R (R=Right stereo channel) are formed according to a mixing matrix H. The coefficients in the matrix H can be fixed, signal dependent or controlled by a user.

Alternatively, the matrix can be controlled by side information, transmitted along with the down-mix, containing a parametric description on how to up-mix the signals of the down-mix to form the desired multi-channel output. This spatial side information is usually generated by a signal encoder prior to the up-mix process.

This is typically done in parametric spatial audio coding as, for example, in Parametric Stereo, cf. J. Breebaart, S. van de Par, A. Kohlrausch, E. Schuijers, "High-Quality Parametric Spatial Audio Coding at Low Bitrates" in AES 116$^{th}$ Convention, Berlin, Preprint 6072, May 2004 and in MPEG Surround, cf. J. Herre, K. Kjörling, J. Breebaart, et. al., "MPEG Surround—the ISO/MPEG Standard for Efficient and Compatible Multi-Channel Audio Coding" in Proceedings of the 122$^{nd}$ AES Convention, Vienna, Austria, May 2007. A typical structure of a parametric stereo decoder is shown in FIG. 7. In this example, the decorrelation process is performed in a transform domain, which is indicated by the analysis filterbank 710, which transforms an input mono signal to the transform domain as, for example, the frequency domain in terms of a number of frequency bands.

In the frequency domain, the decorrelator 720 generates the according decorrelated signal, which is to be up-mixed in the up-mix matrix 730. The up-mix matrix 730 considers up-mix parameters, which are provided by the parameter modification box 740, which is provided with spatial input parameters and coupled to a parameter control stage 750. In the example shown in FIG. 7, the spatial parameters can be modified by a user or additional tools as, for example, post-processing for binaural rendering/presentation. In this case, the up-mix parameters can be merged with the parameters from the binaural filters to form the input parameters for the up-mix matrix 730. The measuring of the parameters may be carried out by the parameter modification block 740. The output of the up-mix matrix 730 is then provided to a synthesis filterbank 760, which determines the stereo output signal.

As described above, the output L/R of the mixing matrix H can be computer from the mono input signal M and the decorrelated signal D, for example according to $$\begin{bmatrix} L \\ R \end{bmatrix} = \begin{bmatrix} h_{11} & h_{12} \\ h_{21} & h_{22} \end{bmatrix} \begin{bmatrix} M \\ D \end{bmatrix}.$$

In the mixing matrix, the amount of decorrelated sound fed to the output can be controlled on the basis of transmitted parameters as, for example, ICC (ICC=Interchannel Correlation) and/or mixed or user-defined settings.

Another conventional approach is established by the temporal permutation method. A dedicated proposal on decorrelation of applause-like signals can be found, for example, in Gerard Hotho, Steven van de Par, Jeroen Breebaart, "Multichannel Coding of Applause Signals," in EURASIP Journal on Advances in Signal Processing, Vol. 1, Art. 10, 2008. Here, a monophonic audio signal is segmented into overlapping time segments, which are temporally permuted pseudo randomly within a "super"-block to form the decorrelated output channels. The permutations are mutually independent for a number n output channels.

Another approach is the alternating channel swap of original and delayed copy in order to obtain a decorrelated signal, cf. German patent application 102007018032.4-55.

In some conventional conceptual object-orientated systems, e.g. in Wagner, Andreas; Walther, Andreas; Melchoir, Frank; Strauβ, Michael; "Generation of Highly Immersive Atmospheres for Wave Field Synthesis Reproduction" at 116$^{th}$ International EAS Convention, Berlin, 2004, it is described how to create an immersive scene out of many objects as for example single claps, by application of a wave field synthesis.

Yet another approach is the so-called "directional audio coding" (DirAC=Directional Audio Coding), which is a method for spatial sound representation, applicable for different sound reproduction systems, cf. Pulkki, Ville, "Spatial Sound Reproduction with Directional Audio Coding" in J. Audio Eng. Soc., Vol. 55, No. 6, 2007. In the analysis part, the diffuseness and direction of arrival of sound are estimated in a single location dependent on time and frequency. In the synthesis part, microphone signals are first divided into non-diffuse and diffuse parts and are then reproduced using different strategies.

Conventional approaches have a number of disadvantages. For example, guided or unguided up-mix of audio signals having content such as applause may use a strong decorrelation. Consequently, on the one hand, strong decorrelation is needed to restore the ambience sensation of being, for example, in a concert hall. On the other hand, suitable decorrelation filters as, for example, all-pass filters, degrade a reproduction of quality of transient events, like a single hand-clap by introducing temporal smearing effects such as pre- and post-echoes and filter ringing. Moreover, spatial panning of single clap events has to be done on a rather fine time grid, while ambience decorrelation should be quasi-stationary over time.

State of the art systems according to J. Breebaart, S. van de Par, A. Kohlrausch, E. Schuijers, "High-Quality Parametric Spatial Audio Coding at Low Bitrates" in AES 116$^{th}$ Convention, Berlin, Preprint 6072, May 2004 and J. Herre, K. Kjörling, J. Breebaart, et. al., "MPEG Surround—the ISO/MPEG Standard for Efficient and Compatible Multi-Channel Audio Coding" in Proceedings of the 122$^{nd}$ AES Convention, Vienna, Austria, May 2007 compromise temporal resolution vs. ambience stability and transient quality degradation vs. ambience decorrelation.

A system utilizing the temporal permutation method, for example, will exhibit perceivable degradation of the output sound due to a certain repetitive quality in the output audio signal. This is because of the fact that one and the same segment of the input signal appears unaltered in every output channel, though at a different point in time. Furthermore, to avoid increased applause density, some original channels have to be dropped in the up-mix and, thus, some important auditory event might be missed in the resulting up-mix.

In object-orientated systems, typically such sound events are spatialized as a large group of point-like sources, which leads to a computationally complex implementation.

SUMMARY

According to an embodiment, an apparatus for determining a spatial output multi-channel audio signal based on an input audio signal may have: a semantic decomposer configured for decomposing the input audio signal to acquire a first decomposed signal having a first semantic property, the first decomposed signal being a foreground signal part, and a second decomposed signal having a second semantic property being different from the first semantic property, the second decomposed signal being a background signal part; a renderer configured for rendering the foreground signal part using amplitude panning to acquire a first rendered signal having the first semantic property, the renderer having an amplitude panning stage for processing the foreground signal part, wherein locally-generated low pass noise is provided to the amplitude panning stage for temporally varying a panning location of an audio source in the foreground signal part; and for rendering the background signal part by decorrelating the second decomposed signal to acquire a second rendered signal having the second semantic property; and a processor configured for processing the first rendered signal and the second rendered signal to acquire the spatial output multi-channel audio signal.

According to another embodiment, a method for determining a spatial output multi-channel audio signal based on an input audio signal and an input parameter may have the steps of: semantically decomposing the input audio signal to acquire a first decomposed signal having a first semantic property, the first decomposed signal being a foreground signal part, and a second decomposed signal having a second semantic property being different from the first semantic property, the second decomposed signal being a background signal part; rendering the foreground signal part using amplitude panning to acquire a first rendered signal having the first semantic property, by processing the foreground signal part in an amplitude panning stage, wherein locally-generated low pass noise is provided to the amplitude panning stage for temporally varying a panning location of an audio source in the foreground signal part; rendering the background signal part by decorrelation decorrelating the second decomposed signal to acquire a second rendered signal having the second semantic property; and processing the first rendered signal and the second rendered signal to acquire the spatial output multi-channel audio signal.

According to another embodiment, a computer program having a program code for performing the method for determining a spatial output multi-channel audio signal based on an input audio signal and an input parameter, which method may have the steps of: semantically decomposing the input audio signal to acquire a first decomposed signal having a first semantic property, the first decomposed signal being a foreground signal part, and a second decomposed signal having a second semantic property being different from the first semantic property, the second decomposed signal being a background signal part; rendering the foreground signal part using amplitude panning to acquire a first rendered signal having the first semantic property, by processing the foreground signal part in an amplitude panning stage, wherein locally-generated low pass noise is provided to the amplitude panning stage for temporally varying a panning location of an audio source in the foreground signal part; rendering the background signal part by decorrelation decorrelating the second decomposed signal to acquire a second rendered signal having the second semantic property; and processing the first rendered signal and the second rendered signal to acquire the spatial output multi-channel audio signal, when the program code runs on a computer or a processor.

It is a finding of the present invention that an audio signal can be decomposed in several components to which a spatial rendering, for example, in terms of a decorrelation or in terms of an amplitude-panning approach, can be adapted. In other words, the present invention is based on the finding that, for example, in a scenario with multiple audio sources, foreground and background sources can be distinguished and rendered or decorrelated differently. Generally different spatial depths and/or extents of audio objects can be distinguished.

One of the key points of the present invention is the decomposition of signals, like the sound originating from an applauding audience, a flock of birds, a sea shore, galloping horses, a division of marching soldiers, etc. into a foreground and a background part, whereby the foreground part contains single auditory events originated from, for example, nearby sources and the background part holds the ambience of the perceptually-fused far-off events. Prior to final mixing, these two signal parts are processed separately, for example, in order to synthesize the correlation, render a scene, etc.

Embodiments are not bound to distinguish only foreground and background parts of the signal, they may distinguish multiple different audio parts, which all may be rendered or decorrelated differently.

In general, audio signals may be decomposed into n different semantic parts by embodiments, which are processed separately. The decomposition/separate processing of different semantic components may be accomplished in the time and/or in the frequency domain by embodiments.

Embodiments may provide the advantage of superior perceptual quality of the rendered sound at moderate computational cost. Embodiments therewith provide a novel decorrelation/rendering method that offers high perceptual quality at moderate costs, especially for applause-like critical audio material or other similar ambience material like, for example, the noise that is emitted by a flock of birds, a sea shore, galloping horses, a division of marching soldiers, etc.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
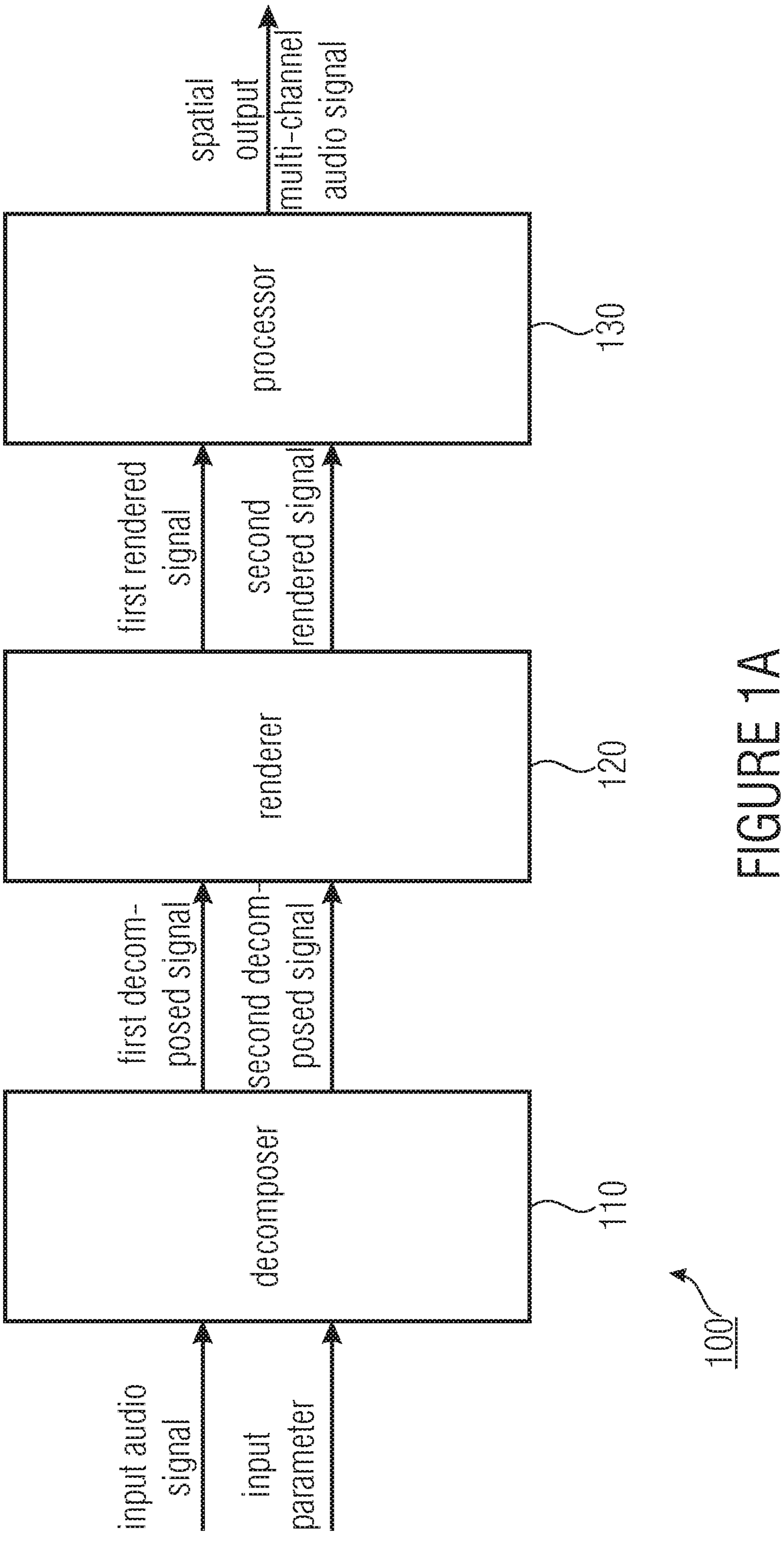
FIG. 1*a* shows an embodiment of an apparatus for determining a spatial audio multi-channel audio signal.

FIG. 1 shows an embodiment of an apparatus 100 for determining a spatial output multi-channel audio signal based on an input audio signal. In some embodiments the apparatus can be adapted for further basing the spatial output multi-channel audio signal on an input parameter. The input parameter may be generated locally or provided with the input audio signal, for example, as side information.

In the embodiment depicted in FIG. 1, the apparatus 100 comprises a decomposer 110 for decomposing the input audio signal to obtain a first decomposed signal having a first semantic property and a second decomposed signal having a second semantic property being different from the first semantic property.

The apparatus 100 further comprises a renderer 120 for rendering the first decomposed signal using a first rendering characteristic to obtain a first rendered signal having the first semantic property and for rendering the second decomposed signal using a second rendering characteristic to obtain a second rendered signal having the second semantic property.

A semantic property may correspond to a spatial property, as close or far, focused or wide, and/or a dynamic property as e.g. whether a signal is tonal, stationary or transient and/or a dominance property as e.g. whether the signal is foreground or background, a measure thereof respectively.

Moreover, in the embodiment, the apparatus 100 comprises a processor 130 for processing the first rendered signal and the second rendered signal to obtain the spatial output multi-channel audio signal.

In other words, the decomposer 110 is adapted for decomposing the input audio signal, in some embodiments based on the input parameter. The decomposition of the input audio signal is adapted to semantic, e.g. spatial, properties of different parts of the input audio signal. Moreover, rendering carried out by the renderer 120 according to the first and second rendering characteristics can also be adapted to the spatial properties, which allows, for example in a scenario where the first decomposed signal corresponds to a background audio signal and the second decomposed signal corresponds to a foreground audio signal, different rendering or decorrelators may be applied, the other way around respectively. In the following the term "foreground" is understood to refer to an audio object being dominant in an audio environment, such that a potential listener would notice a foreground-audio object. A foreground audio object or source may be distinguished or differentiated from a background audio object or source. A background audio object or source may not be noticeable by a potential listener in an audio environment as being less dominant than a foreground audio object or source. In embodiments foreground audio objects or sources may be, but are not limited to, a point-like audio source, where background audio objects or sources may correspond to spatially wider audio objects or sources.

In other words, in embodiments the first rendering characteristic can be based on or matched to the first semantic property and the second rendering characteristic can be based on or matched to the second semantic property. In one embodiment the first semantic property and the first rendering characteristic correspond to a foreground audio source or object and the renderer 120 can be adapted to apply amplitude panning to the first decomposed signal. The renderer 120 may then be further adapted for providing as the first rendered signal two amplitude panned versions of the first decomposed signal. In this embodiment, the second semantic property and the second rendering characteristic correspond to a background audio source or object, a plurality thereof respectively, and the renderer 120 can be adapted to apply a decorrelation to the second decomposed signal and provide as second rendered signal the second decomposed signal and the decorrelated version thereof.

In embodiments, the renderer 120 can be further adapted for rendering the first decomposed signal such that the first rendering characteristic does not have a delay introducing characteristic. In other words, there may be no decorrelation of the first decomposed signal. In another embodiment, the first rendering characteristic may have a delay introducing characteristic having a first delay amount and the second rendering characteristic may have a second delay amount, the second delay amount being greater than the first delay amount. In other words in this embodiment, both the first decomposed signal and the second decomposed signal may be decorrelated, however, the level of decorrelation may scale with amount of delay introduced to the respective decorrelated versions of the decomposed signals. The decorrelation may therefore be stronger for the second decomposed signal than for the first decomposed signal.

In embodiments, the first decomposed signal and the second decomposed signal may overlap and/or may be time synchronous. In other words, signal processing may be carried out block-wise, where one block of input audio signal samples may be sub-divided by the decomposer 110 in a number of blocks of decomposed signals. In embodiments, the number of decomposed signals may at least partly overlap in the time domain, i.e. they may represent overlapping time domain samples. In other words, the decomposed signals may correspond to parts of the input audio signal, which overlap, i.e. which represent at least partly simultaneous audio signals. In embodiments the first and second decomposed signals may represent filtered or transformed versions of an original input signal. For example, they may represent signal parts being extracted from a composed spatial signal corresponding for example to a close sound source or a more distant sound source. In other embodiments they may correspond to transient and stationary signal components, etc.

In embodiments, the renderer 120 may be sub-divided in a first renderer and a second renderer, where the first renderer can be adapted for rendering the first decomposed signal and the second renderer can be adapted for rendering the second decomposed signal. In embodiments, the renderer 120 may be implemented in software, for example, as a program stored in a memory to be run on a processor or a digital signal processor which, in turn, is adapted for rendering the decomposed signals sequentially.

The renderer 120 can be adapted for decorrelating the first decomposed signal to obtain a first decorrelated signal and/or for decorrelating the second decomposed signal to obtain a second decorrelated signal. In other words, the renderer 120 may be adapted for decorrelating both decomposed signals, however, using different decorrelation or rendering characteristics. In embodiments, the renderer 120 may be adapted for applying amplitude panning to either one of the first or second decomposed signals instead or in addition to decorrelation.

The renderer 120 may be adapted for rendering the first and second rendered signals each having as many components as channels in the spatial output multi-channel audio signal and the processor 130 may be adapted for combining the components of the first and second rendered signals to obtain the spatial output multi-channel audio signal. In other embodiments the renderer 120 can be adapted for rendering the first and second rendered signals each having less components than the spatial output multi-channel audio signal and wherein the processor 130 can be adapted for up-mixing the components of the first and second rendered signals to obtain the spatial output multi-channel audio signal.

Figure 1B:
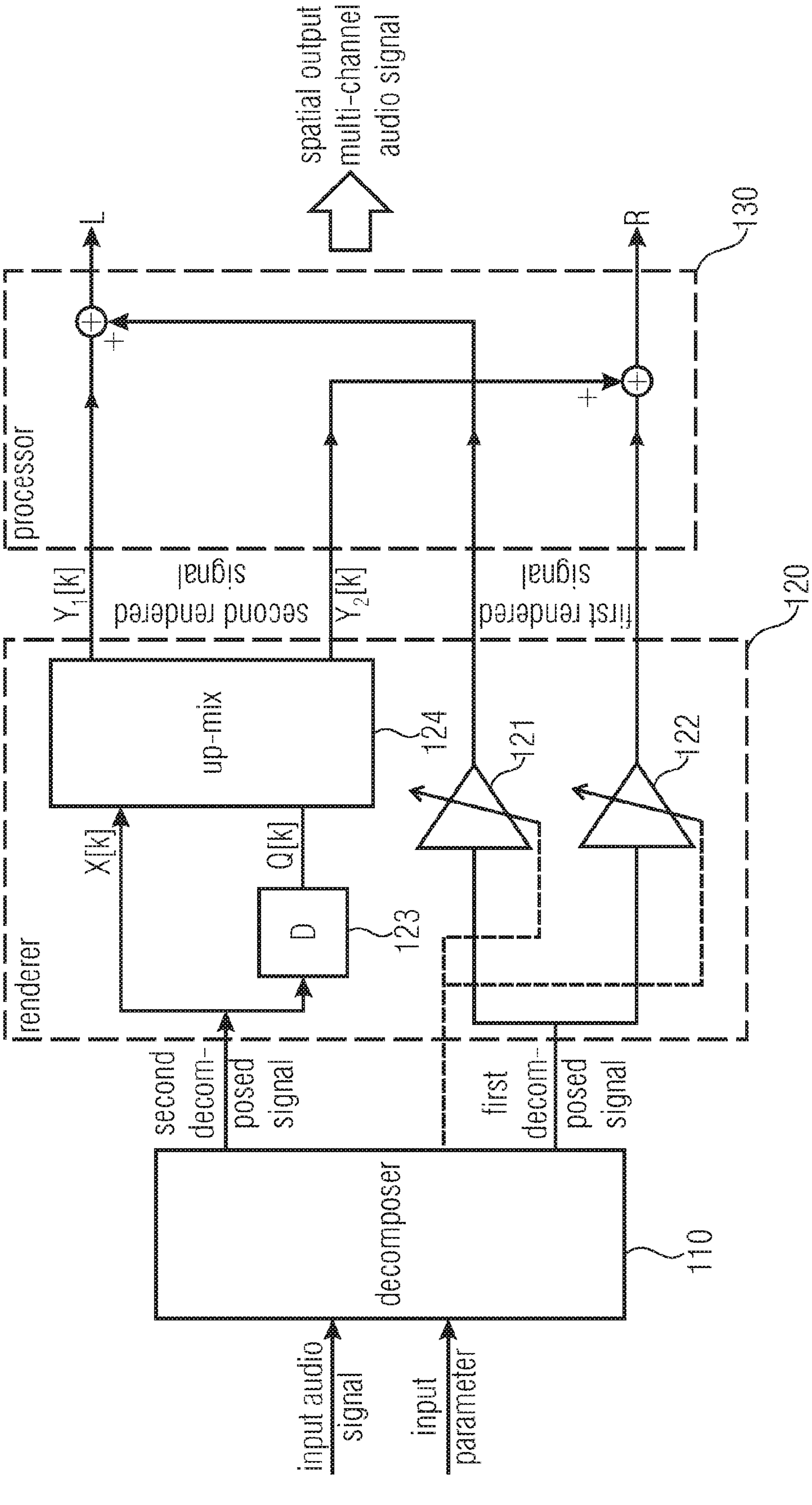
FIG. 1*b* shows a block diagram of another embodiment.

FIG. 1*b* shows another embodiment of an apparatus 100, comprising similar components as were introduced with the help of FIG. 1*a*. However, FIG. 1*b* shows an embodiment having more details. FIG. 1*b* shows a decomposer 110 receiving the input audio signal and optionally the input parameter. As can be seen from FIG. 1*b*, the decomposer is adapted for providing a first decomposed signal and a second decomposed signal to a renderer 120, which is indicated by the dashed lines. In the embodiment shown in FIG. 1*b*, it is assumed that the first decomposed signal corresponds to a point-like audio source as the first semantic property and that the renderer 120 is adapted for applying amplitude-panning as the first rendering characteristic to the first decomposed signal. In embodiments the first and second decomposed signals are exchangeable, i.e. in other embodiments amplitude-panning may be applied to the second decomposed signal.

In the embodiment depicted in FIG. 1*b*, the renderer 120 shows, in the signal path of the first decomposed signal, two scalable amplifiers 121 and 122, which are adapted for amplifying two copies of the first decomposed signal differently. The different amplification factors used may, in embodiments, be determined from the input parameter, in other embodiments, they may be determined from the input audio signal, it may be preset or it may be locally generated, possibly also referring to a user input. The outputs of the two scalable amplifiers 121 and 122 are provided to the processor 130, for which details will be provided below.

As can be seen from FIG. 1*b*, the decomposer 110 provides a second decomposed signal to the renderer 120, which carries out a different rendering in the processing path of the second decomposed signal. In other embodiments, the first decomposed signal may be processed in the presently described path as well or instead of the second decomposed signal. The first and second decomposed signals can be exchanged in embodiments.

In the embodiment depicted in FIG. 1*b*, in the processing path of the second decomposed signal, there is a decorrelator 123 followed by a rotator or parametric stereo or up-mix module 124 as second rendering characteristic. The decorrelator 123 can be adapted for decorrelating the second decomposed signal X[k] and for providing a decorrelated version Q[k] of the second decomposed signal to the parametric stereo or up-mix module 124. In FIG. 1*b*, the mono signal X[k] is fed into the decorrelator unit "D" 123 as well as the up-mix module 124. The decorrelator unit 123 may create the decorrelated version Q[k] of the input signal, having the same frequency characteristics and the same long term energy. The up-mix module 124 may calculate an up-mix matrix based on the spatial parameters and synthesize the output channels $Y_1[k]$ and $Y_2[k]$. The up-mix module can be explained according to $$\begin{bmatrix} Y_1[k] \\ Y_2[k] \end{bmatrix} = \begin{bmatrix} c_l & 0 \\ 0 & c_r \end{bmatrix} \begin{bmatrix} \cos(\alpha+\beta) & \sin(\alpha+\beta) \\ \cos(-\alpha+\beta) & \sin(-\alpha+\beta) \end{bmatrix} \begin{bmatrix} X[k] \\ Q[k] \end{bmatrix}$$

with the parameters $c_l$, $c_r$, $\alpha$ and $\beta$ being constants, or time- and frequency-variant values estimated from the input signal X[k] adaptively, or transmitted as side information along with the input signal X[k] in the form of e.g. ILD (ILD=Inter channel Level Difference) parameters and ICC (ICC=Inter Channel Correlation) parameters. The signal X[k] is the received mono signal, the signal Q[k] is the de-correlated signal, being a decorrelated version of the input signal X[k]. The output signals are denoted by $Y_1[k]$ and $Y_2[k]$.

The decorrelator 123 may be implemented as an IIR filter (IIR=Infinite Impulse Response), an arbitrary FIR filter (FIR=Finite Impulse response) or a special FIR filter using a single tap for simply delaying the signal.

The parameters $c_l$, $c_r$, $\alpha$ and $\beta$ can be determined in different ways. In some embodiments, they are simply determined by input parameters, which can be provided along with the input audio signal, for example, with the down-mix data as a side information. In other embodiments, they may be generated locally or derived from properties of the input audio signal.

In the embodiment shown in FIG. 1*b*, the renderer 120 is adapted for providing the second rendered signal in terms of the two output signals $Y_1[k]$ and $Y_2[k]$ of the up-mix module 124 to the processor 130.

According to the processing path of the first decomposed signal, the two amplitude-panned versions of the first decomposed signal, available from the outputs of the two scalable amplifiers 121 and 122 are also provided to the processor 130. In other embodiments, the scalable amplifiers 121 and 122 may be present in the processor 130, where only the first decomposed signal and a panning factor may be provided by the renderer 120.

As can be seen in FIG. 1*b*, the processor 130 can be adapted for processing or combining the first rendered signal and the second rendered signal, in this embodiment simply by combining the outputs in order to provide a stereo signal having a left channel L and a right channel R corresponding to the spatial output multi-channel audio signal of FIG. 1*a*.

In the embodiment in FIG. 1*b*, in both signaling paths, the left and right channels for a stereo signal are determined. In the path of the first decomposed signal, amplitude panning is carried out by the two scalable amplifiers 121 and 122, therefore, the two components result in two in-phase audio signals, which are scaled differently. This corresponds to an impression of a point-like audio source as a semantic property or rendering characteristic.

In the signal-processing path of the second decomposed signal, the output signals $Y_1[k]$ and $Y_2[k]$ are provided to the processor 130 corresponding to left and right channels as determined by the up-mix module 124. The parameters $c_l$, $c_r$, α and β determine the spatial wideness of the corresponding audio source. In other words, the parameters $c_l$, $c_r$, α and β can be chosen in a way or range such that for the L and R channels any correlation between a maximum correlation and a minimum correlation can be obtained in the second signal-processing path as second rendering characteristic. Moreover, this may be carried out independently for different frequency bands. In other words, the parameters $c_l$, $c_r$, α and β can be chosen in a way or range such that the L and R channels are in-phase, modeling a point-like audio source as semantic property.

The parameters $c_l$, $c_r$, α and β may also be chosen in a way or range such that the L and R channels in the second signal processing path are decorrelated, modeling a spatially rather distributed audio source as semantic property, e.g. modeling a background or spatially wider sound source.

Figure 2:
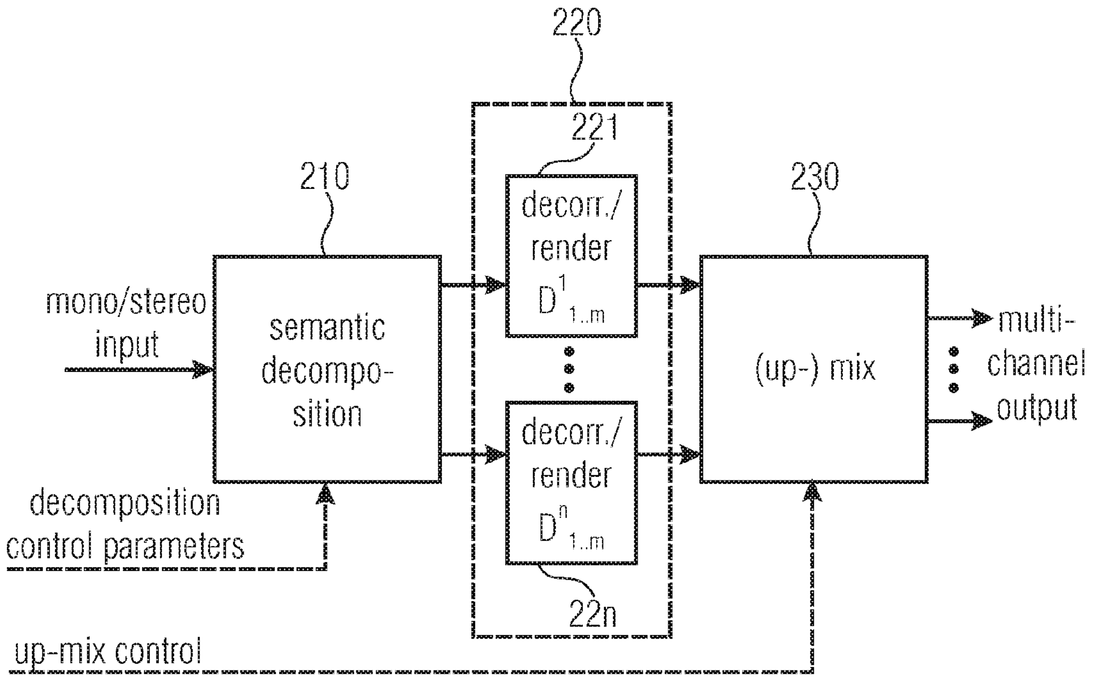
FIG. 2 shows an embodiment illustrating a multiplicity of decomposed signals.

FIG. 2 illustrates another embodiment, which is more general. FIG. 2 shows a semantic decomposition block 210, which corresponds to the decomposer 110. The output of the semantic decomposition 210 is the input of a rendering stage 220, which corresponds to the renderer 120. The rendering stage 220 is composed of a number of individual renderers 221 to **22*n*, i.e. the semantic decomposition stage 210** is adapted for decomposing a mono/stereo input signal into n decomposed signals, having n semantic properties. The decomposition can be carried out based on decomposition controlling parameters, which can be provided along with the mono/stereo input signal, be preset, be generated locally or be input by a user, etc.

In other words, the decomposer 110 can be adapted for decomposing the input audio signal semantically based on the optional input parameter and/or for determining the input parameter from the input audio signal.

The output of the decorrelation or rendering stage 220 is then provided to an up-mix block 230, which determines a multi-channel output on the basis of the decorrelated or rendered signals and optionally based on up-mix controlled parameters.

Generally, embodiments may separate the sound material into n different semantic components and decorrelate each component separately with a matched decorrelator, which are also labeled $D^1$ to $D^n$ in FIG. 2. In other words, in embodiments the rendering characteristics can be matched to the semantic properties of the decomposed signals. Each of the decorrelators or renderers can be adapted to the semantic properties of the accordingly-decomposed signal component. Subsequently, the processed components can be mixed to obtain the output multi-channel signal. The different components could, for example, correspond foreground and background modeling objects.

In other words, the renderer 120 can be adapted for combining the first decomposed signal and the first decorrelated signal to obtain a stereo or multi-channel up-mix signal as the first rendered signal and/or for combining the second decomposed signal and the second decorrelated signal to obtain a stereo up-mix signal as the second rendered signal.

Moreover, the renderer 120 can be adapted for rendering the first decomposed signal according to a background audio characteristic and/or for rendering the second decomposed signal according to a foreground audio characteristic or vice versa.

Since, for example, applause-like signals can be seen as composed of single, distinct nearby claps and a noise-like ambience originating from very dense far-off claps, a suitable decomposition of such signals may be obtained by distinguishing between isolated foreground clapping events as one component and noise-like background as the other component. In other words, in one embodiment, n=2. In such an embodiment, for example, the renderer 120 may be adapted for rendering the first decomposed signal by amplitude panning of the first decomposed signal. In other words, the correlation or rendering of the foreground clap component may, in embodiments, be achieved in $D^1$ by amplitude panning of each single event to its estimated original location.

In embodiments, the renderer 120 may be adapted for rendering the first and/or second decomposed signal, for example, by all-pass filtering the first or second decomposed signal to obtain the first or second decorrelated signal.

In other words, in embodiments, the background can be decorrelated or rendered by the use of m mutually independent all-pass filters $D^2_{1 \ldots m}$. In embodiments, only the quasi-stationary background may be processed by the all-pass filters, the temporal smearing effects of the state of the art decorrelation methods can be avoided this way. As amplitude panning may be applied to the events of the foreground object, the original foreground applause density can approximately be restored as opposed to the state of the art's system as, for example, presented in paragraph J. Breebaart, S. van de Par, A. Kohlrausch, E. Schuijers, "High-Quality Parametric Spatial Audio Coding at Low Bitrates" in AES 116$^{th}$ Convention, Berlin, Preprint 6072, May 2004 and J. Herre, K. Kjörling, J. Breebaart, et. al., "MPEG Surround—the ISO/MPEG Standard for Efficient and Compatible Multi-Channel Audio Coding" in Proceedings of the 122$^{nd}$ AES Convention, Vienna, Austria, May 2007.

In other words, in embodiments, the decomposer 110 can be adapted for decomposing the input audio signal semantically based on the input parameter, wherein the input parameter may be provided along with the input audio signal as, for example, a side information. In such an embodiment, the decomposer 110 can be adapted for determining the input parameter from the input audio signal. In other embodiments, the decomposer 110 can be adapted for determining the input parameter as a control parameter independent from the input audio signal, which may be generated locally, preset, or may also be input by a user.

In embodiments, the renderer 120 can be adapted for obtaining a spatial distribution of the first rendered signal or the second rendered signal by applying a broadband amplitude panning. In other words, according to the description of FIG. **1*b* above, instead of generating a point-like source, the panning location of the source can be temporally varied in order to generate an audio source having a certain spatial distribution. In embodiments, the renderer 120 can be adapted for applying the locally-generated low-pass noise for amplitude panning, i.e. the scaling factors for the amplitude panning for, for example, the scalable amplifiers 121 and 122 in FIG. 1*b*** correspond to a locally-generated noise value, i.e. are time-varying with a certain bandwidth.

Embodiments may be adapted for being operated in a guided or an unguided mode. For example, in a guided scenario, referring to the dashed lines, for example in FIG. 2, the decorrelation can be accomplished by applying standard technology decorrelation filters controlled on a coarse time grid to, for example, the background or ambience part only and obtain the correlation by redistribution of each single event in, for example, the foreground part via time variant spatial positioning using broadband amplitude panning on a much finer time grid. In other words, in embodiments, the renderer 120 can be adapted for operating decorrelators for different decomposed signals on different time grids, e.g. based on different time scales, which may be in terms of different sample rates or different delay for the respective decorrelators. In one embodiment, carrying out foreground and background separation, the foreground part may use amplitude panning, where the amplitude is changed on a much finer time grid than operation for a decorrelator with respect to the background part.

Figure 3:
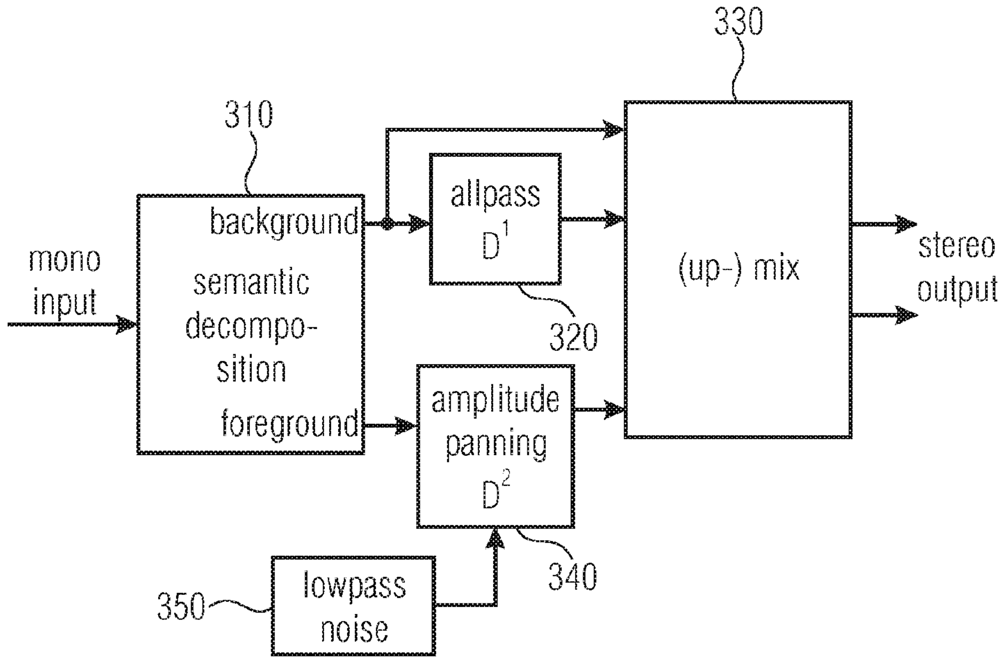
FIG. 3 illustrates an embodiment with a foreground and a background semantic decomposition.

Furthermore, it is emphasized that for the decorrelation of, for example, applause-like signals, i.e. signals with quasi-stationary random quality, the exact spatial position of each single foreground clap may not be as much of crucial importance, as rather the recovery of the overall distribution of the multitude of clapping events. Embodiments may take advantage of this fact and may operate in an unguided mode. In such a mode, the aforementioned amplitude-panning factor could be controlled by low-pass noise. FIG. 3 illustrates a mono-to-stereo system implementing the scenario. FIG. 3 shows a semantic decomposition block 310 corresponding to the decomposer 110 for decomposing the mono input signal into a foreground and background decomposed signal part.

As can be seen from FIG. 3, the background decomposed part of the signal is rendered by all-pass $D^1$ 320. The decorrelated signal is then provided together with the un-rendered background decomposed part to the up-mix 330, corresponding to the processor 130. The foreground decomposed signal part is provided to an amplitude panning $D^2$ stage 340, which corresponds to the renderer 120. Locally-generated low-pass noise 350 is also provided to the amplitude panning stage 340, which can then provide the foreground-decomposed signal in an amplitude-panned configuration to the up-mix 330. The amplitude panning $D^2$ stage 340 may determine its output by providing a scaling factor k for an amplitude selection between two of a stereo set of audio channels. The scaling factor k may be based on the lowpass noise.

As can be seen from FIG. 3, there is only one arrow between the amplitude panning 340 and the up-mix 330. This one arrow may as well represent amplitude-panned signals, i.e. in case of stereo up-mix, already the left and the right channel. As can be seen from FIG. 3, the up-mix 330 corresponding to the processor 130 is then adapted to process or combine the background and foreground decomposed signals to derive the stereo output.

Other embodiments may use native processing in order to derive background and foreground decomposed signals or input parameters for decomposition. The decomposer 110 may be adapted for determining the first decomposed signal and/or the second decomposed signal based on a transient separation method. In other words, the decomposer 110 can be adapted for determining the first or second decomposed signal based on a separation method and the other decomposed signal based on the difference between the first determined decomposed signal and the input audio signal. In other embodiments, the first or second decomposed signal may be determined based on the transient separation method and the other decomposed signal may be based on the difference between the first or second decomposed signal and the input audio signal.

The decomposer 110 and/or the renderer 120 and/or the processor 130 may comprise a DirAC monosynth stage and/or a DirAC synthesis stage and/or a DirAC merging stage. In embodiments the decomposer 110 can be adapted for decomposing the input audio signal, the renderer 120 can be adapted for rendering the first and/or second decomposed signals, and/or the processor 130 can be adapted for processing the first and/or second rendered signals in terms of different frequency bands.

Figure 4:
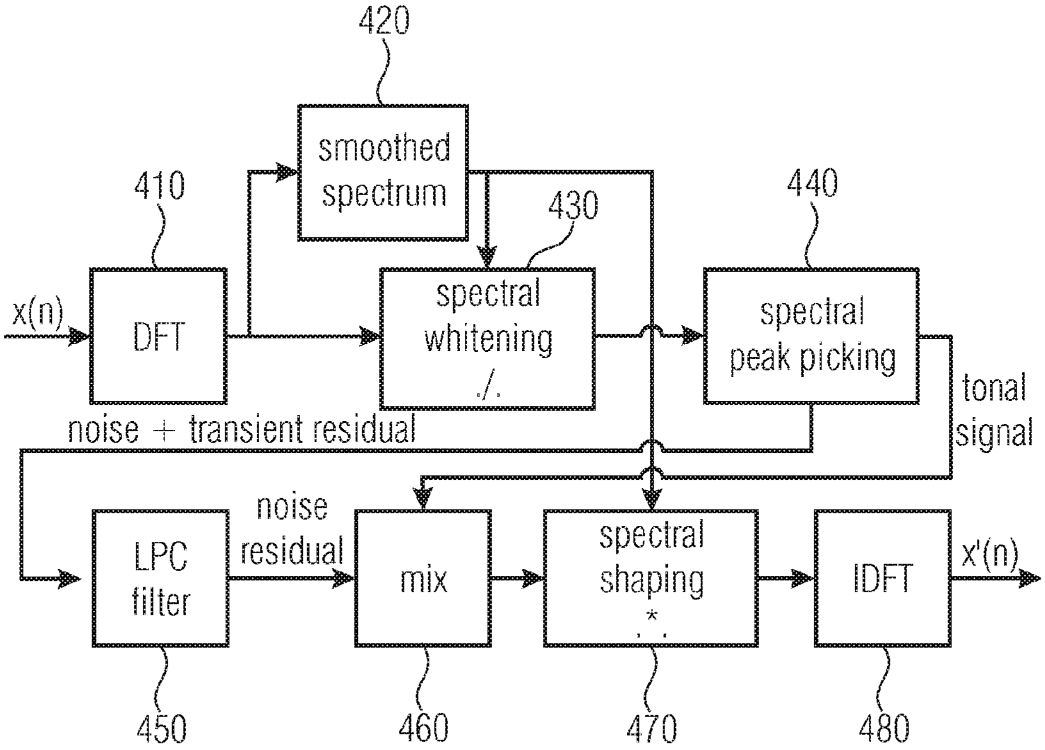
FIG. 4 illustrates an example of a transient separation method for obtaining a background signal component.

Embodiments may use the following approximation for applause-like signals. While the foreground components can be obtained by transient detection or separation methods, cf. Pulkki, Ville; "Spatial Sound Reproduction with Directional Audio Coding" in J. Audio Eng. Soc., Vol. 55, No. 6, 2007, the background component may be given by the residual signal. FIG. 4 depicts an example where a suitable method to obtain a background component x'(n) of, for example, an applause-like signal x(n) to implement the semantic decomposition 310 in FIG. 3, i.e. an embodiment of the decomposer 120. FIG. 4 shows a time-discrete input signal x(n), which is input to a DFT 410 (DFT=Discrete Fourier Transform). The output of the DFT block 410 is provided to a block for smoothing the spectrum 420 and to a spectral whitening block 430 for spectral whitening on the basis of the output of the DFT 410 and the output of the smooth spectrum stage 430.

The output of the spectral whitening stage 430 is then provided to a spectral peak-picking stage 440, which separates the spectrum and provides two outputs, i.e. a noise and transient residual signal and a tonal signal. The noise and transient residual signal is provided to an LPC filter 450 (LPC=Linear Prediction Coding) of which the residual noise signal is provided to the mixing stage 460 together with the tonal signal as output of the spectral peak-picking stage 440. The output of the mixing stage 460 is then provided to a spectral shaping stage 470, which shapes the spectrum on the basis of the smoothed spectrum provided by the smoothed spectrum stage 420. The output of the spectral shaping stage 470 is then provided to the synthesis filter 480, i.e. an inverse discrete Fourier transform in order to obtain x'(n) representing the background component. The foreground component can then be derived as the difference between the input signal and the output signal, i.e. as x(n)-x'(n).

Embodiments of the present invention may be operated in a virtual reality applications as, for example, 3D gaming. In such applications, the synthesis of sound sources with a large spatial extent may be complicated and complex when based on conventional concepts. Such sources might, for example, be a seashore, a bird flock, galloping horses, the division of marching soldiers, or an applauding audience. Typically, such sound events are spatialized as a large group of point-like sources, which leads to computationally-complex implementations, cf. Wagner, Andreas; Walther, Andreas; Melchoir, Frank; Strauβ, Michael; "Generation of Highly Immersive Atmospheres for Wave Field Synthesis Reproduction" at 116*th* International EAS Convention, Berlin, 2004.

Embodiments may carry out a method, which performs the synthesis of the extent of sound sources plausibly but, at the same time, having a lower structural and computational complexity. Embodiments may be based on DirAC (DirAC Directional Audio Coding), cf. Pulkki, Ville; "Spatial Sound Reproduction with Directional Audio Coding" in J. Audio Eng. Soc., Vol. 55, No. 6, 2007. In other words, in embodiments, the decomposer 110 and/or the renderer 120 and/or the processor 130 may be adapted for processing DirAC signals. In other words, the decomposer 110 may comprise DirAC monosynth stages, the renderer 120 may comprise a DirAC synthesis stage and/or the processor may comprise a DirAC merging stage.

Embodiments may be based on DirAC processing, for example, using only two synthesis structures, for example, one for foreground sound sources and one for background sound sources. The foreground sound may be applied to a single DirAC stream with controlled directional data, resulting in the perception of nearby point-like sources. The background sound may also be reproduced by using a single direct stream with differently-controlled directional data, which leads to the perception of spatially-spread sound objects. The two DirAC streams may then be merged and decoded for arbitrary loudspeaker set-up or for headphones, for example.

Figure 5:
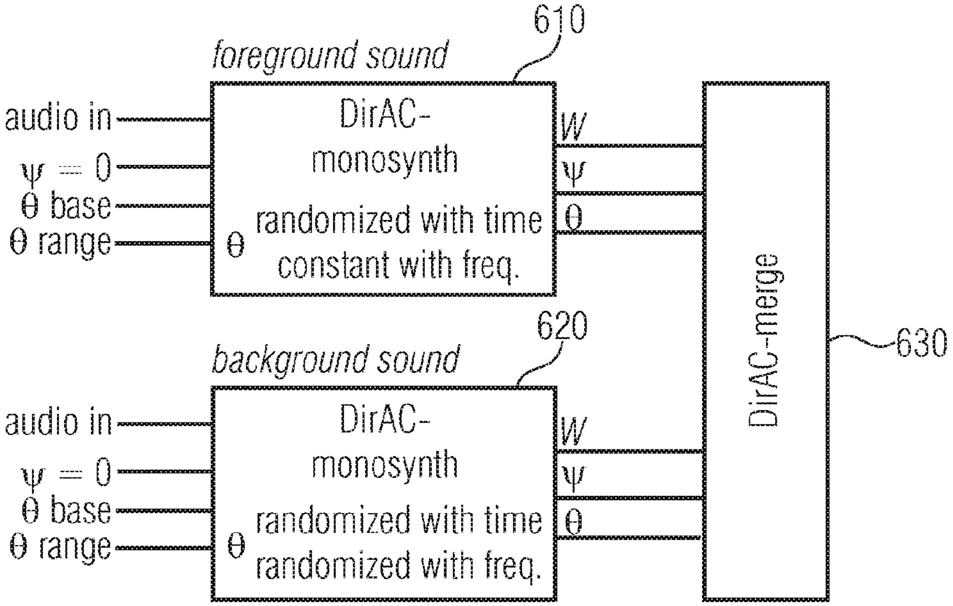
FIG. 5 illustrates a synthesis of sound sources having spatially a large extent.
Figure 6:
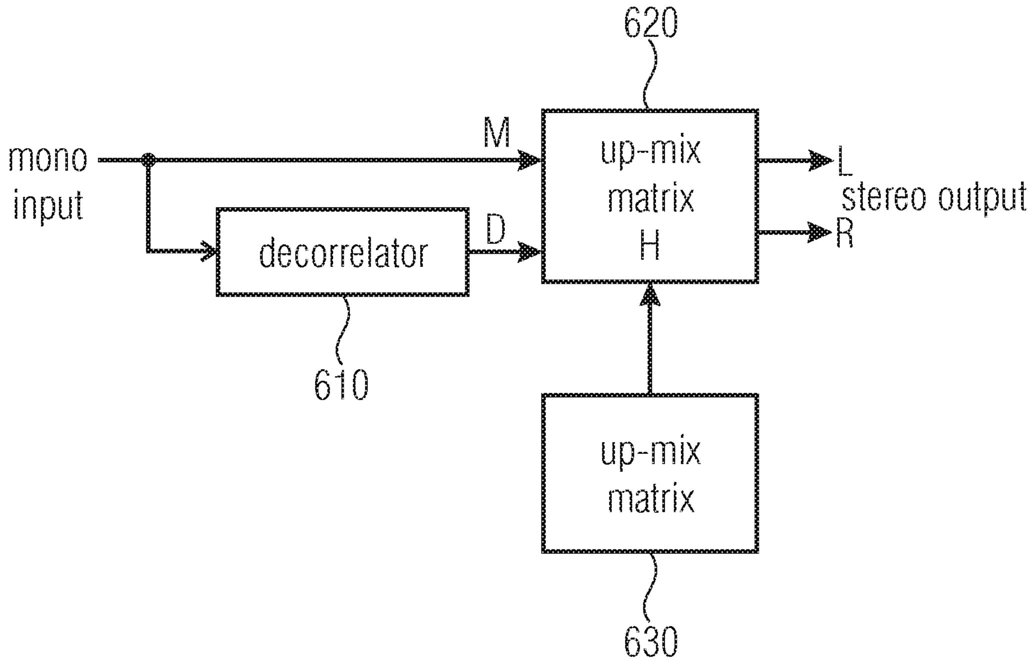
FIG. 6 illustrates one state of the art application of a decorrelator in time domain in a mono-to-stereo up-mixer.
Figure 7:
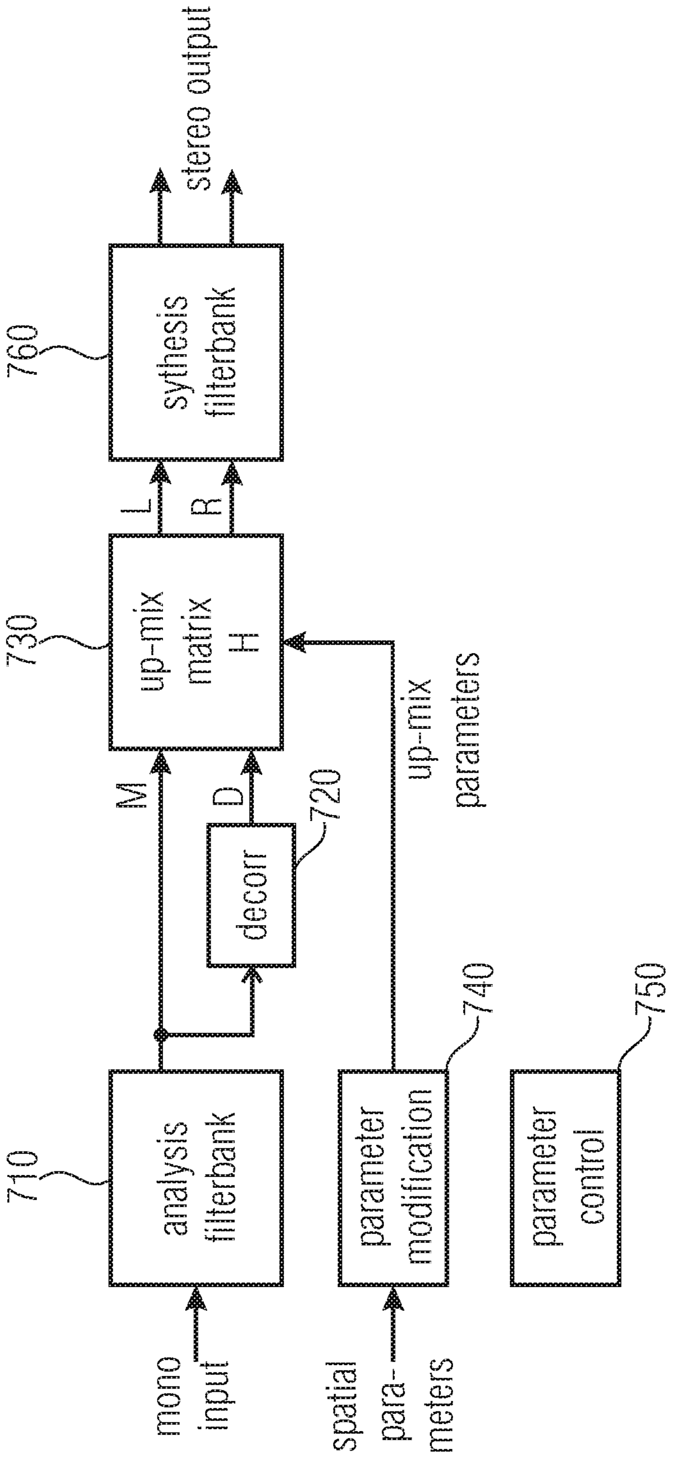
FIG. 7 shows another state of the art application of a decorrelator in frequency domain in a mono-to-stereo up-mixer scenario.

FIG. 5 illustrates a synthesis of sound sources having a spatially-large extent. FIG. 5 shows an upper monosynth block 610, which creates a mono-DirAC stream leading to a perception of a nearby point-like sound source, such as the nearest clappers of an audience. The lower monosynth block 620 is used to create a mono-DirAC stream leading to the perception of spatially-spread sound, which is, for example, suitable to generate background sound as the clapping sound from the audience. The outputs of the two DirAC monosynth blocks 610 and 620 are then merged in the DirAC merge stage 630. FIG. 5 shows that only two DirAC synthesis blocks 610 and 620 are used in this embodiment. One of them is used to create the sound events, which are in the foreground, such as closest or nearby birds or closest or nearby persons in an applauding audience and the other generates a background sound, the continuous bird flock sound, etc.

The foreground sound is converted into a mono-DirAC stream with DirAC-monosynth block 610 in a way that the azimuth data is kept constant with frequency, however, changed randomly or controlled by an external process in time. The diffuseness parameter $\psi$ is set to 0, i.e. representing a point-like source. The audio input to the block 610 is assumed to be temporarily non-overlapping sounds, such as distinct bird calls or hand claps, which generate the perception of nearby sound sources, such as birds or clapping persons. The spatial extent of the foreground sound events is controlled by adjusting the $\theta$ and $\theta_{range\_foreground}$, which means that individual sound events will be perceived in $\theta \pm \theta_{range\_foreground}$ directions, however, a single event may be perceived point-like. In other words, point-like sound sources are generated where the possible positions of the point are limited to the range $\theta \pm \theta_{range\_foreground}$.

The background block 620 takes as input audio stream, a signal, which contains all other sound events not present in the foreground audio stream, which is intended to include lots of temporarily overlapping sound events, for example hundreds of birds or a great number of far-away clappers. The attached azimuth values are then set random both in time and frequency, within given constraint azimuth values $\theta \pm \theta_{range\_background}$. The spatial extent of the background sounds can thus be synthesized with low computational complexity. The diffuseness $\psi$ may also be controlled. If it was added, the DirAC decoder would apply the sound to all directions, which can be used when the sound source surrounds the listener totally. If it does not surround, diffuseness may be kept low or close to zero, or zero in embodiments.

Embodiments of the present invention can provide the advantage that superior perceptual quality of rendered sounds can be achieved at moderate computational cost. Embodiments may enable a modular implementation of spatial sound rendering as, for example, shown in FIG. 5.

Depending on certain implementation requirements of the inventive methods, the inventive methods can be implemented in hardware or in software. The implementation can be performed using a digital storage medium and, particularly, a flash memory, a disc, a DVD or a CD having electronically-readable control signals stored thereon, which co-operate with the programmable computer system, such that the inventive methods are performed. Generally, the present invention is, therefore, a computer-program product with a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for determining a spatial output multi-channel audio signal based on an input audio signal, comprising:

a semantic decomposer configured for decomposing the input audio signal to obtain a first decomposed signal having a first semantic property, the first decomposed signal being a foreground signal part, and a second decomposed signal having a second semantic property being different from the first semantic property, the second decomposed signal being a background signal part;

a renderer for rendering the first decomposed signal using a first rendering characteristic to obtain a first rendered signal having the first semantic property and for rendering the second decomposed signal using a second rendering characteristic to obtain a second rendered signal having the second semantic property, wherein the first rendering characteristic and the second rendering characteristic are different from each other, wherein the renderer comprises a first DirAC monosynth stage for rendering the foreground signal part, the first DirAC monosynth stage being configured for creating a first mono-DirAC stream leading to a perception of a nearby point-like source, and a second DirAC monosynth stage for rendering the background signal part, the second DirAC monosynth stage being configured for creating a mono-DirAC stream leading to a perception of spatially-spread sound, wherein a mono-DirAC stream comprises omnidirectional signal data and directional data, and wherein the corresponding DirAC monosynth stage is configured for generating the directional data by controlling, in time or frequency, directional data input into the corresponding DirAC monosynth stage; and a processor for processing the first rendered signal and the second rendered signal to obtain the spatial output multi-channel audio signal, wherein the processor comprises a DirAC merging stage for merging the first mono-DirAC stream and the second mono-DirAC stream, wherein at least one of the semantic decomposer, the renderer, and the processor comprises a hardware implementation.

2. The apparatus of claim 1, in which the first DirAC monosynth stage is configured so that azimuth data is kept constant with frequency and changed randomly or controlled by an external process in time within a controlled azimuth range, and a diffuseness parameter is set to zero, and in which the second DirAC monosynth stage is configured so that azimuth data are set random in time and frequency within given constraint azimuth values.

3. A method for determining a spatial output multi-channel audio signal based on an input audio signal and an input parameter comprising the steps of:

semantically decomposing, by a semantic decomposer, the input audio signal to obtain a first decomposed signal having a first semantic property, the first decomposed signal being a foreground signal part, and a second decomposed signal having a second semantic property being different from the first semantic property, the second decomposed signal being a background signal part;

rendering, by a renderer, the first decomposed signal using a first rendering characteristic to obtain a first rendered signal having the first semantic property by processing the first decomposed signal in a first DirAC monosynth stage, the first DirAC monosynth stage being configured for creating a first mono-DirAC stream leading to a perception of a nearby point-like source;

rendering the second decomposed signal using a second rendering characteristic to obtain a second rendered signal having the second semantic property by processing the second decomposed signal in a second DirAC monosynth stage, the second DirAC monosynth stage being configured for creating a mono-DirAC stream leading to a perception of spatially-spread sound, wherein a mono-DirAC stream comprises omnidirectional signal data and directional data, and wherein the corresponding DirAC monosynth stage is configured for generating the directional data by controlling, in time or frequency, directional data input into the corresponding DirAC monosynth stage; and processing, by a processor, the first rendered signal and the second rendered signal to obtain the spatial output multi-channel audio signal by using a DirAC merging stage for merging the first mono-DirAC stream and the second mono-DirAC stream, wherein at least one of the semantic decomposer, the renderer, and the processor comprises a hardware implementation.

4. The method of claim 3, in which, in the first DirAC monosynth stage, azimuth data is kept constant with frequency and changed randomly or controlled by an external process in time within a controlled azimuth range, and a diffuseness parameter is set to zero, and in which, in the second DirAC monosynth stage, azimuth data is set random in time and frequency within given constraint azimuth values.

5. A non-transitory storage medium having stored thereon a computer program having a program code for performing the method of claim 3, when the program code runs on a computer or a processor.

* * * * *

UNITED STATES PATENT AND TRADEMARK OFFICE

CERTIFICATE OF CORRECTION

PATENT NO. : 8,879,742 B2
APPLICATION NO. : 13/291964
DATED : November 4, 2014
INVENTOR(S) : Sascha Disch et al.

It is certified that error appears in the above-identified patent and that said Letters Patent is hereby corrected as shown below:

Title page, item (73) Assignee:

Fraunhofer-Gesellschaft zur Foerderung der Angewandten Forschung E.V.

should be:

FRAUNHOFER-GESELLSCHAFT ZUR FOERDERUNG DER ANGEWANDTEN FORSCHUNG E.V.

Signed and Sealed this
Tenth Day of November, 2015

Michelle K. Lee
*Director of the United States Patent and Trademark Office*